United States Patent
Hakushima et al.

(10) Patent No.: US 11,682,897 B2
(45) Date of Patent: Jun. 20, 2023

(54) POWER SUPPLY CONTROL APPARATUS AND POWER SUPPLY CONTROL METHOD

(71) Applicant: DENSO TEN Limited, Kobe (JP)

(72) Inventors: Daiki Hakushima, Kobe (JP); Hiroshi Matsumoto, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/699,705

(22) Filed: Mar. 21, 2022

(65) Prior Publication Data

US 2023/0085180 A1 Mar. 16, 2023

(30) Foreign Application Priority Data

Sep. 13, 2021 (JP) .............................. JP2021-148883

(51) Int. Cl.
*H02H 7/22* (2006.01)
*H02H 3/16* (2006.01)

(52) U.S. Cl.
CPC ................ *H02H 7/22* (2013.01); *H02H 3/16* (2013.01)

(58) Field of Classification Search
CPC ........ B60R 16/033; G01R 31/52; H02H 3/08; H02H 3/16; H02H 7/22; H02H 7/26; H02H 7/268; H02H 7/28; H02H 9/02; H02J 1/08; H02J 1/082; H02J 1/084; H02J 1/10; H02J 2310/46; H02J 7/0031; H02J 7/0068; H02J 7/1423; H02J 7/143; H02J 7/1492; H02J 7/34; H02J 9/061; H02J 9/068; H02J 9/08; H02M 1/32; H02M 1/325; H02M 3/00; H02M 3/158
See application file for complete search history.

(56) References Cited

U.S. PATENT DOCUMENTS

| | | | | |
|---|---|---|---|---|
| 11,588,346 | B2* | 2/2023 | Hakushima | ........... H02J 7/0031 |
| 2020/0216002 | A1* | 7/2020 | Mazaki | ................. H02J 7/1423 |
| 2021/0402939 | A1* | 12/2021 | Obayashi | .............. H02J 7/0063 |
| 2022/0169193 | A1* | 6/2022 | Mazaki | .................... H02J 1/084 |
| 2022/0263323 | A1* | 8/2022 | Hakushima | ............... H02J 7/34 |
| 2022/0306020 | A1* | 9/2022 | Matsumoto | .............. H02H 3/08 |
| 2022/0368153 | A1* | 11/2022 | Hakushima | ............. H02J 9/061 |
| 2023/0010565 | A1* | 1/2023 | Pressman | ................. H02H 7/18 |

FOREIGN PATENT DOCUMENTS

| | | | |
|---|---|---|---|
| JP | 2019-062727 A | | 4/2019 |
| JP | 2021142810 A | * | 9/2021 |

* cited by examiner

*Primary Examiner* — Jared Fureman
*Assistant Examiner* — Nicolas Bellido
(74) *Attorney, Agent, or Firm* — Oliff PLC

(57) ABSTRACT

A power supply control apparatus includes: a first system configured to supply electric power of a first power supply to a first load; a second system configured to supply electric power of a second power supply to a second load; an inter-system switch capable of connecting the first system to the second system and disconnecting the first system from the second system; a battery switch capable of connecting the second power supply to the second system and disconnecting the second power supply from the second system; a primary ground fault detection unit configured to cut off the inter-system switch and conduct the battery switch when a ground fault of the first system or the second system is detected by the primary ground fault detection unit; a secondary ground fault detection unit as defined herein; and a failure determination unit as defined herein.

9 Claims, 10 Drawing Sheets

POWER SUPPLY CONTROL APPARATUS AND POWER SUPPLY CONTROL METHOD

CROSS-REFERENCE TO RELATED APPLICATION

This application is based on and claims priority under 35 USC 119 from Japanese Patent Application No. 2021-148883 filed on Sep. 13, 2021.

TECHNICAL FIELD

The disclosed embodiment relates to a power supply control apparatus and a power supply control method.

BACKGROUND ART

There is a power supply control apparatus including a first system that supplies electric power of a first power supply to a first load, a second system that supplies electric power of a second power supply to a second load, an inter-system switch capable of connecting and disconnecting the first system to/from the second system, and a battery switch capable of connecting and disconnecting the second power supply to/from the second system.

When the power supply control apparatus detects that a voltage of the first system or the second system decreases to less than a ground fault determination threshold, the power supply control apparatus cuts off the inter-system switch and specifies a system where a ground fault occurs. When the voltages of the first system and the second system return to a value equal to or larger than the ground fault within a predetermined time, the power supply control apparatus determines that the first system and the second system are normal, reconnects the inter-system switch, and returns to a normal control (for example, see JP-A-2019-62727).

SUMMARY OF INVENTION

However, in the power supply control apparatus, when the inter-system switch is in a stuck-opened state, the second power supply cannot be charged, and thus a state of charge (SOC) of the second power supply is insufficient, and there is a possibility that a desired backup cannot be performed. Therefore, the power supply control apparatus needs to detect the stuck-opened state of the inter-system switch.

An aspect of the embodiment has been made in view of the above circumstance, and an object thereof is to provide a power supply control apparatus capable of detecting a stuck-opened state of an inter-system switch.

A power supply control apparatus according to an aspect of the embodiment includes a first system, a second system, an inter-system switch, a battery switch, a primary ground fault detection unit, a secondary ground fault detection unit, and a failure determination unit. The first system supplies electric power of a first power supply to a first load. The second system supplies electric power of a second power supply to a second load. The inter-system switch is capable of connecting and disconnecting the first system to/from the second system. The battery switch is capable of connecting and disconnecting the second power supply to/from the second system. When a ground fault of the first system or the second system is detected, the primary ground fault detection unit cuts off the inter-system switch and conducts the battery switch. When a ground fault is detected by the primary ground fault detection unit, the secondary ground fault detection unit specifies whether the system in which the ground fault is detected is the first system or the second system, and when the ground fault is eliminated, the secondary ground fault detection unit performs return control of reconnecting the inter-system switch and cutting off the battery switch. The failure determination unit determines that the inter-system switch is in a stuck-opened state when frequency at which the return control and the ground fault detection by the primary ground fault detection unit are repeated after the ground fault is detected by the primary ground fault detection unit is equal to or higher than a predetermined frequency.

The power supply control apparatus according to an aspect of the embodiment has an effect of being capable of detecting the stuck-opened state of the inter-system switch.

DETAILED DESCRIPTION OF THE INVENTION

Hereinafter, an embodiment of a power supply control apparatus will be described in detail with reference to the accompanying drawings. The present invention is not limited to the following embodiment. Hereinafter, a power control apparatus mounted on a vehicle that has an automated driving function and supplying electric power to a load will be described as an example, but the power supply control apparatus according to the embodiment may be mounted on a vehicle that does not have the automated driving function.

Further, although a case where the vehicle on which the power supply control apparatus is mounted is an electric vehicle or a hybrid vehicle will be described, the vehicle on which the power supply control apparatus is mounted may be an engine vehicle traveling by an internal combustion engine.

The power supply control apparatus according to the embodiment includes a first power supply and a second power supply. When a power supply failure occurs in a power supply system of either the first power supply or the second power supply, the power supply control apparatus may be mounted on any apparatus that backs up the first power supply by the other power supply system.

[1. Configuration of Power Supply Control Apparatus]

Figure 1:
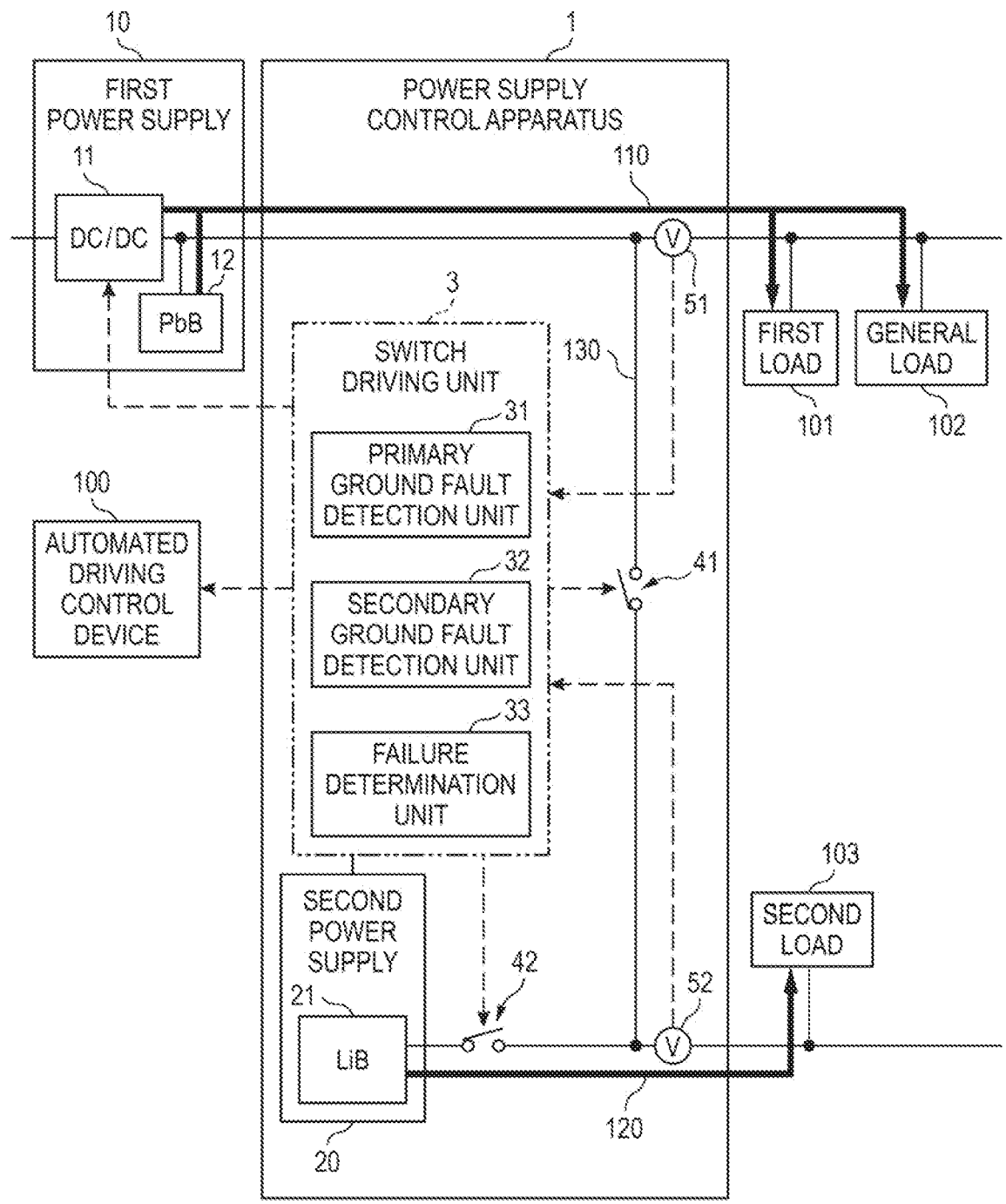
FIG. 1 is an illustrative diagram illustrating a configuration example of a power supply control apparatus according to an embodiment.

FIG. 1 is an illustrative diagram illustrating a configuration example of the power supply control apparatus according to the embodiment. As illustrated in FIG. 1, a power supply control apparatus 1 according to the embodiment is connected to a first power supply 10, a first load 101, a general load 102, a second load 103, and an automated driving control device 100. The power supply control apparatus 1 includes a first system 110 that supplies electric power of the first power supply 10 to the first load 101 and the general load 102, and a second system 120 that supplies electric power of a second power supply 20, which will be described later, to the second load 103.

The first load 101 includes a load for automated driving. For example, the first load 101 includes a steering motor, an electric brake device, an in-vehicle camera, and the like that operate during the automated driving. The general load 102 includes, for example, a display, an air conditioner, an audio, a video, and various lights.

The second load 103 includes a part of the automated driving function of the first load 101. For example, the second load 103 includes minimum necessary devices for fail-safe control (FOP) such as a steering motor, an electric brake device, and a radar. The first load 101, the general load 102, and the second load 103 are operated by the electric power supplied from the power supply control apparatus 1.

The automated driving control device 100 is a device that performs automated driving control on the vehicle. The automated driving control device 100 causes the vehicle to travel by automated driving by operating the first load 101 and the second load 103. Further, the automated driving control device 100 can perform the FOP by the second load 103 in a case where a ground fault occurs in the first system 110 during the automated driving, and can perform the FOP by the first load 101 in a case where a ground fault occurs in the second system 120.

The first power supply 10 includes a DC/DC converter (hereinafter, referred to as "DC/DC 11") and a lead battery (hereinafter, referred to as a "PbB 12"). A battery of the first power supply 10 may be any secondary battery other than the PbB 12.

The DC/DC 11 is connected to a generator and a high-voltage battery having a voltage higher than that of the PbB 12, steps down the voltages of the generator and the high-voltage battery, and outputs the stepped-down voltages to the first system 110. The generator is, for example, an alternator that converts kinetic energy of a traveling vehicle into electricity to generate electricity. The high-voltage battery is, for example, a battery for driving a vehicle mounted on the electric vehicle or the hybrid vehicle.

When the first power supply 10 is mounted on the engine vehicle, an alternator (generator) is provided instead of the DC/DC 11. The DC/DC 11 charges the PbB 12, supplies electric power to the first load 101 and the general load 102, supplies electric power to the second load 103, and charges the second power supply 20, which will be described later.

The power supply control apparatus 1 includes the second power supply 20, an inter-system switch 41, a battery switch 42, a switch driving unit 3, a first voltage sensor 51, and a second voltage sensor 52. The second power supply 20 is a backup power supply for a case where the electric power cannot be supplied by the first power supply 10. The second power supply 20 includes a lithium ion battery (hereinafter, referred to as a "LiB 21"). A battery of the second power supply 20 may be any secondary battery other than the LiB 21.

The inter-system switch 41 is a switch provided in an inter-system line 130 that connects the first system 110 to the second system 120, and capable of connecting and disconnecting the first system 110 to/from the second system 120. The battery switch 42 is a switch that connects the second power supply 20 to the second system 120. In the following description, connecting the inter-system switch 41 means electrically connecting the first system 110 to the second system 120, that is, conducting the first system 110 and the second system 120. Further, disconnecting the inter-system switch 41 means disconnecting, that is, cutting off the electrical connection between the first system 110 and the second system 120.

The first voltage sensor 51 is provided in the first system 110, detects a voltage of the first system 110, and outputs a detection result to the switch driving unit 3. The second voltage sensor 52 is provided in the second system 120, detects a voltage of the second system 120, and outputs a detection result to the switch driving unit 3.

The switch driving unit 3 includes a microcomputer having a central processing unit (CPU), a read only memory (ROM), a random access memory (RAM), and the like, and various circuits. The switch driving unit 3 may be configured with hardware such as an application specific integrated circuit (ASIC) or a field programmable gate array (FPGA).

The switch driving unit 3 includes a primary ground fault detection unit 31, a secondary ground fault detection unit 32, and a failure determination unit 33, which function by the CPU executing a program stored in the ROM using the RAM as a work area, and controls the operation of the power supply control apparatus 1. The primary ground fault detection unit 31 may be functioned by the CPU of the microcomputer as mentioned above, but as an example of another embodiment, the primary ground fault detection unit 31 may be provided as a hardware circuit including a comparator to detect a voltage reduction and a one-shot multivibrator to output a signal of a one-shot pulse of, for example, 50 ms.

The primary ground fault detection unit 31 detects a ground fault of the first system 110 or the second system 120 by hardware (for example, a comparator and a one-shot multivibrator). Therefore, the primary ground fault detection unit 31 can quickly detect the ground fault. When the primary ground fault detection unit 31 detects the ground fault of the first system 110 or the second system 120, the primary ground fault detection unit 31 cuts off the inter-system switch 41 and conducts the battery switch 42.

The secondary ground fault detection unit 32 detects the ground fault of the first system 110 or the second system 120 by software. Therefore, a speed at which the secondary ground fault detection unit 32 detects the ground fault is slower than a speed at which the primary ground fault detection unit 31 detects a ground fault due to an influence of AD conversion or the like of output voltages of the first voltage sensor 51 and the second voltage sensor 52. When the ground fault is detected by the primary ground fault detection unit 31, the secondary ground fault detection unit 32 specifies whether the system in which the ground fault is detected is the first system 110 or the second system 120, and when the ground fault is eliminated, the secondary ground fault detection unit performs return control of reconnecting the inter-system switch 41 and cutting off the battery switch 42.

The failure determination unit 33 determines whether the inter-system switch 41 is in a stuck-opened state. A specific configuration example of the switch driving unit 3 will be described later with reference to FIG. 9. When the power supply control apparatus 1 is activated, the switch driving unit 3 connects (turns on) the inter-system switch 41 and cuts off (turns off) the battery switch 42.

The switch driving unit 3 detects a ground fault of the first system 110 or the second system 120 based on the detection results input from the first voltage sensor 51 and the second voltage sensor 52. A specific example of a method for detecting the ground fault by the switch driving unit 3 will be described later.

When the ground fault of the first system 110 or the second system 120 is detected, the switch driving unit 3 notifies the automated driving control device 100 of the fact. When the ground fault of the first system 110 or the second system 120 is detected, the switch driving unit 3 outputs, to the automated driving control device 100, an automated driving prohibition signal indicating that automated driving is impossible. When the ground fault of the first system 110 or the second system 120 is not detected, the switch driving unit 3 outputs, to the automated driving control device 100, an automated driving permission signal indicating that the automated driving is possible.

When the power supply failure such as a ground fault occurs in the first system 110, the switch driving unit 3 cuts off the inter-system switch 41, connects the battery switch 42, and supplies electric power from the second power supply 20 to the second load 103. When the power supply failure such as a ground fault occurs in the second system 120, the switch driving unit 3 supplies electric power from the first power supply 10 to the first load 101 and the general load 102 in a state where the inter-system switch 41 is cut off and the battery switch 42 is cut off.

Accordingly, even if one of the systems has a ground fault during the automated driving, the power supply control apparatus 1 can use the other system, perform the FOP for causing the vehicle to perform retreat traveling to a safe place by the automated driving control device 100, and stop the vehicle. Next, operations of the power supply control apparatus 1 will be described with reference to FIGS. 2 to 8.

[2. Normal Operation of Power Supply Control Apparatus]

Figure 2:
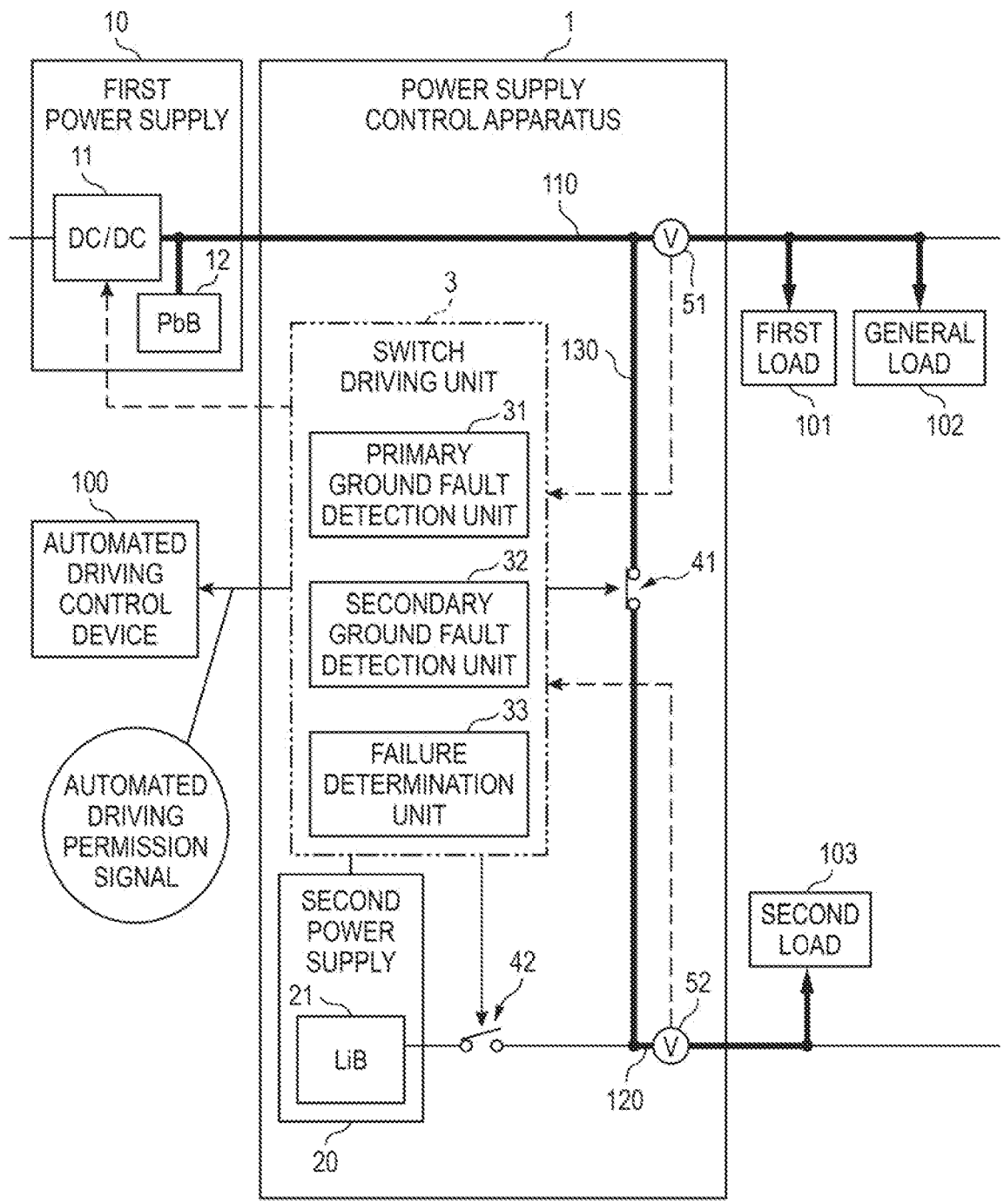
FIG. 2 is an illustrative diagram illustrating an operation example of the power supply control apparatus according to the embodiment.

In normal operation in which no ground fault occurs in the first system 110 and the second system 120, as illustrated in FIG. 2, the switch driving unit 3 cuts off the battery switch 42, connects the inter-system switch 41, and supplies the electric power from the first power supply 10 to the first load 101, the general load 102, and the second load 103. The switch driving unit 3 outputs the automated driving permission signal to the automated driving control device 100 in the normal operation in which no ground fault occurs as described above.

[3. Operation of Power Supply Control Apparatus When Ground Fault Occurs]

Figure 3:
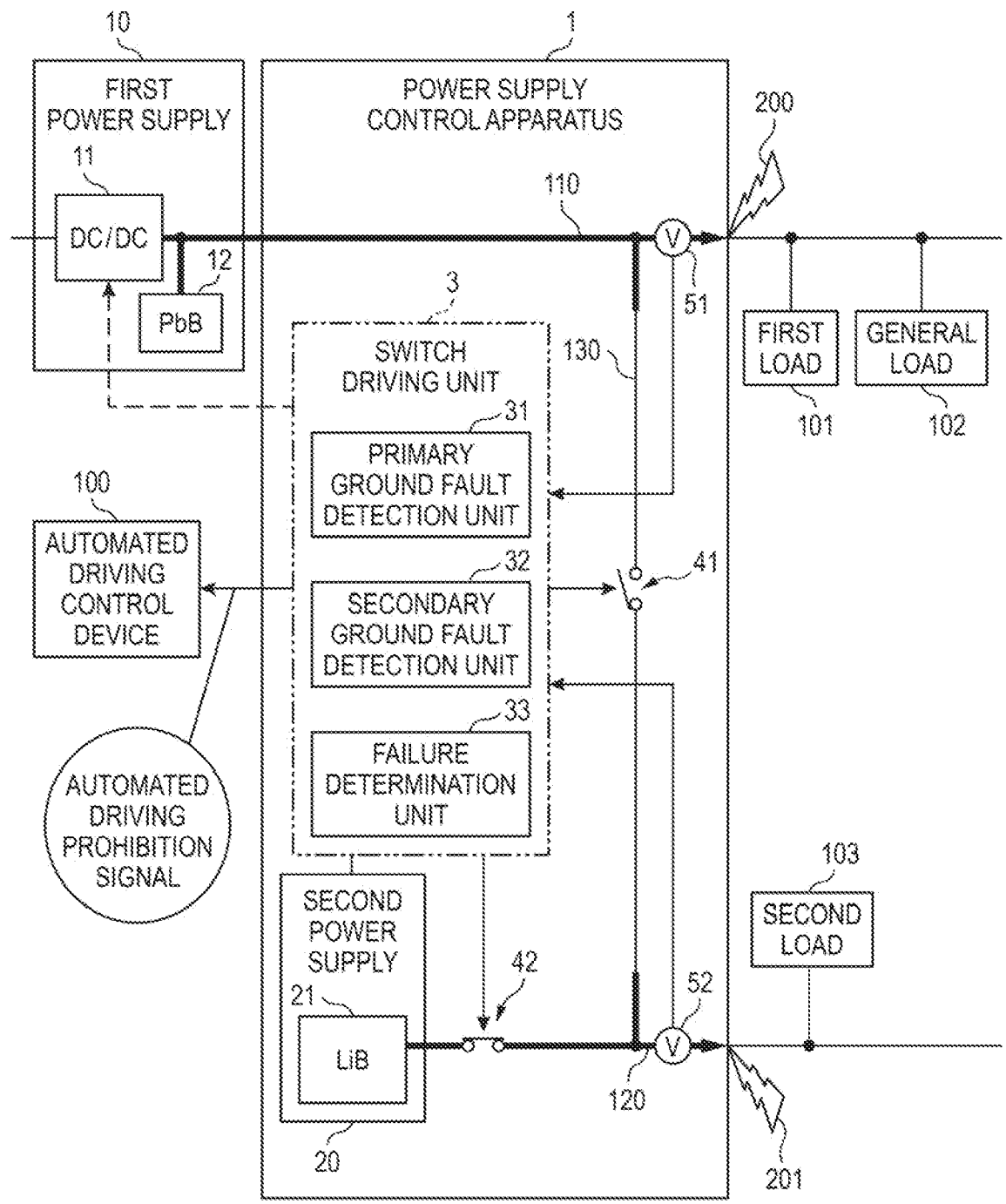
FIG. 3 is an illustrative diagram illustrating an operation example of the power supply control apparatus according to the embodiment.

Next, an operation of the power supply control apparatus 1 when a ground fault occurs will be described with reference to FIGS. 3 to 5. As illustrated in FIG. 3, in the power supply control apparatus 1, for example, when a ground fault 200 occurs in the first system 110 or a ground fault 201 occurs in the second system 120, an overcurrent flows toward a ground fault point, and thus the voltages detected by the first voltage sensor 51 and the second voltage sensor 52 become equal to or less than a ground fault determination threshold.

Therefore, for example, when the voltage detected by the second voltage sensor 52 becomes equal to or less than the ground fault determination threshold, the switch driving unit 3 temporarily determines that the ground fault 200 or 201 occurs in the first system 110 or the second system 120, and outputs the automated driving prohibition signal to the automated driving control device 100. When the switch driving unit 3 temporarily determines that the ground fault 200 or 201 occurs, the switch driving unit 3 cuts off the inter-system switch 41 and connects the battery switch 42. Accordingly, the first system 110 and the second system 120 are disconnected, electric power is supplied from the first power supply 10 to the first system 110, and electric power is supplied from the second power supply 20 to the second system 120.

When the voltage detected by at least one of the first voltage sensor 51 and the second voltage sensor 52 becomes equal to or less than the ground fault determination threshold, the switch driving unit 3 can also temporarily determine that the ground fault occurs in the first system 110 or the second system 120.

Thereafter, when the voltage detected by the first voltage sensor 51 is equal to or less than the ground fault determination threshold for a predetermined time or more and the voltage detected by the second voltage sensor 52 returns to a value exceeding the ground fault determination threshold within the predetermined time, the switch driving unit 3 determines that the ground fault 200 occurs in the first system 110.

Figure 4:
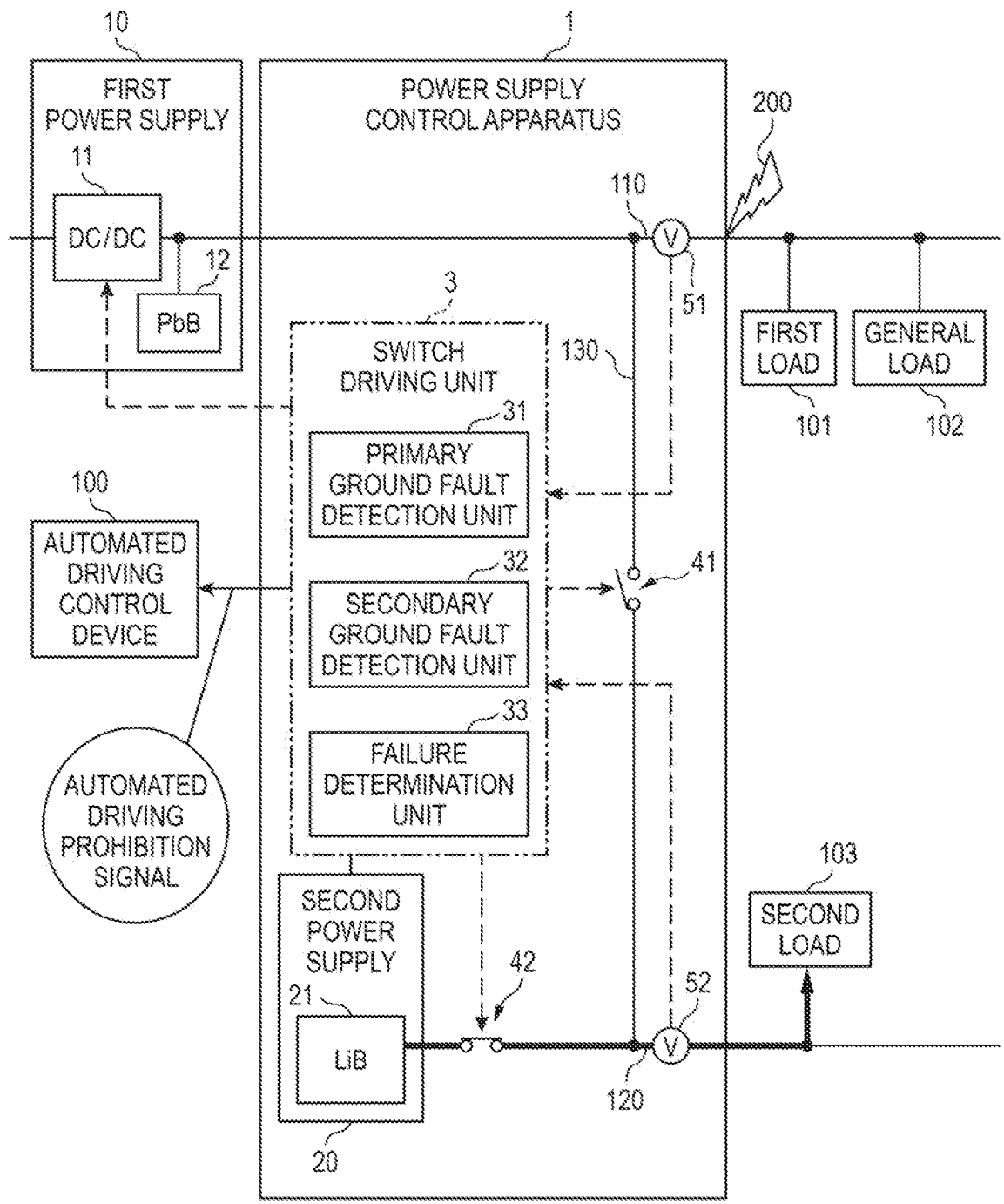
FIG. 4 is an illustrative diagram illustrating an operation example of the power supply control apparatus according to the embodiment.

In this case, as illustrated in FIG. 4, the switch driving unit 3 supplies electric power from the second power supply 20 to the second load 103, and notifies the automated driving control device 100 of the fact. Accordingly, the automated driving control device 100 can operate the second load 103 by the electric power supplied from the second electric power source 20 to cause the vehicle to perform retreat traveling to a safe place and stop the vehicle. The automated driving control device 100 may be configured to start the retreat traveling at a time point when the automated driving prohibition signal is input from the power supply control apparatus 1.

Further, after it is temporarily determined that the ground fault occurs in the first system 110 or the second system 120, when the voltage detected by the second voltage sensor 52 is equal to or less than the ground fault determination threshold even after a predetermined time elapses, and the voltage detected by the first voltage sensor 51 returns to a value exceeding the ground fault determination threshold within the predetermined time, the switch driving unit 3 determines that the ground fault 201 occurs in the second system 120.

Figure 5:
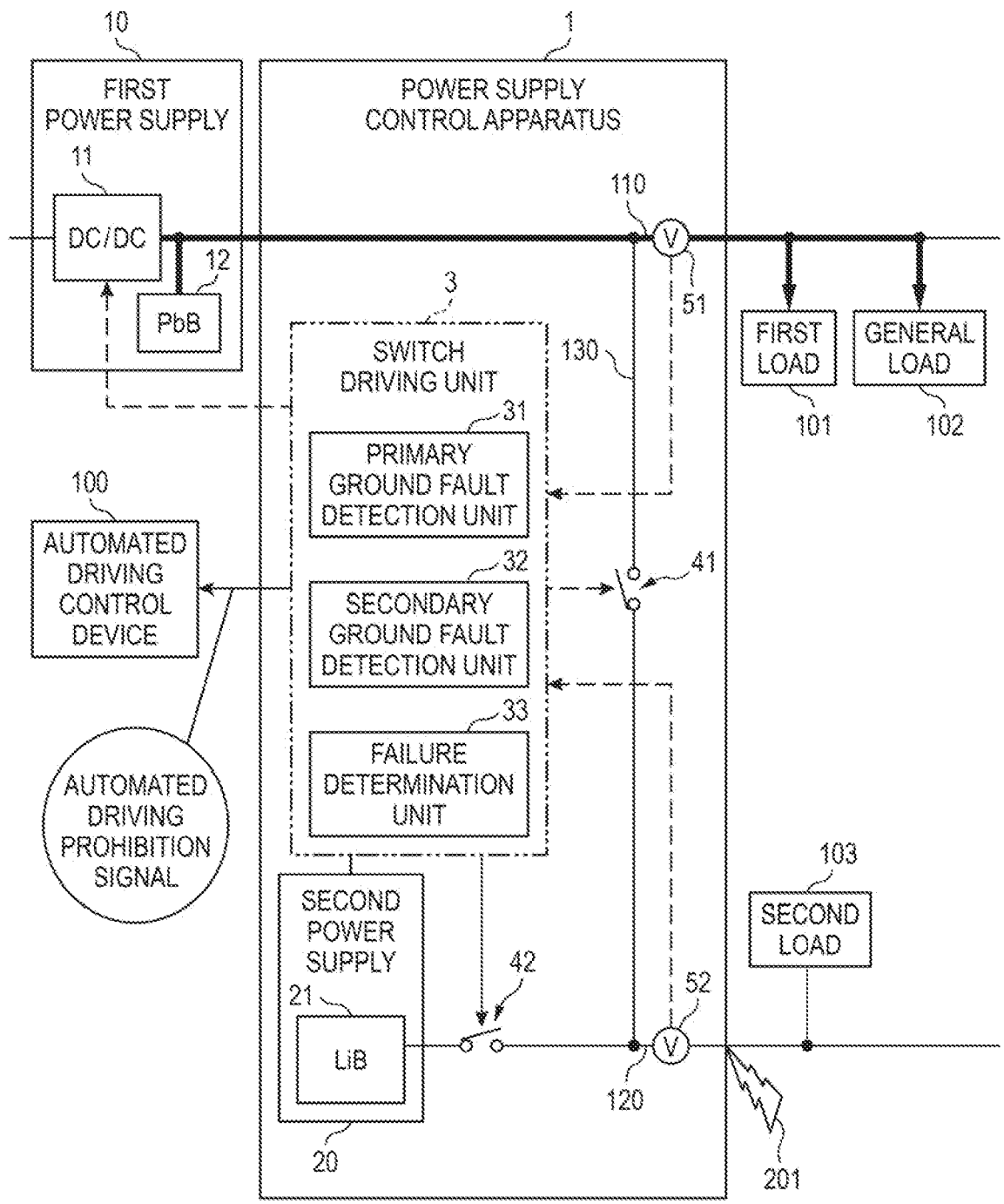
FIG. 5 is an illustrative diagram illustrating an operation example of the power supply control apparatus according to the embodiment.

In this case, as illustrated in FIG. 5, the switch driving unit 3 cuts off the battery switch 42, supplies electric power from the first power supply 10 to the first load 101, and notifies the automated driving control device 100 of the fact. Accordingly, the automated driving control device 100 can operate the first load 101 by the electric power supplied from the first electric power source 10 to cause the vehicle to perform retreat traveling to a safe place and stop the vehicle. The automated driving control device 100 may be configured to start the retreat traveling at a time point when the automated driving prohibition signal is input from the power supply control apparatus 1.

Figure 6:
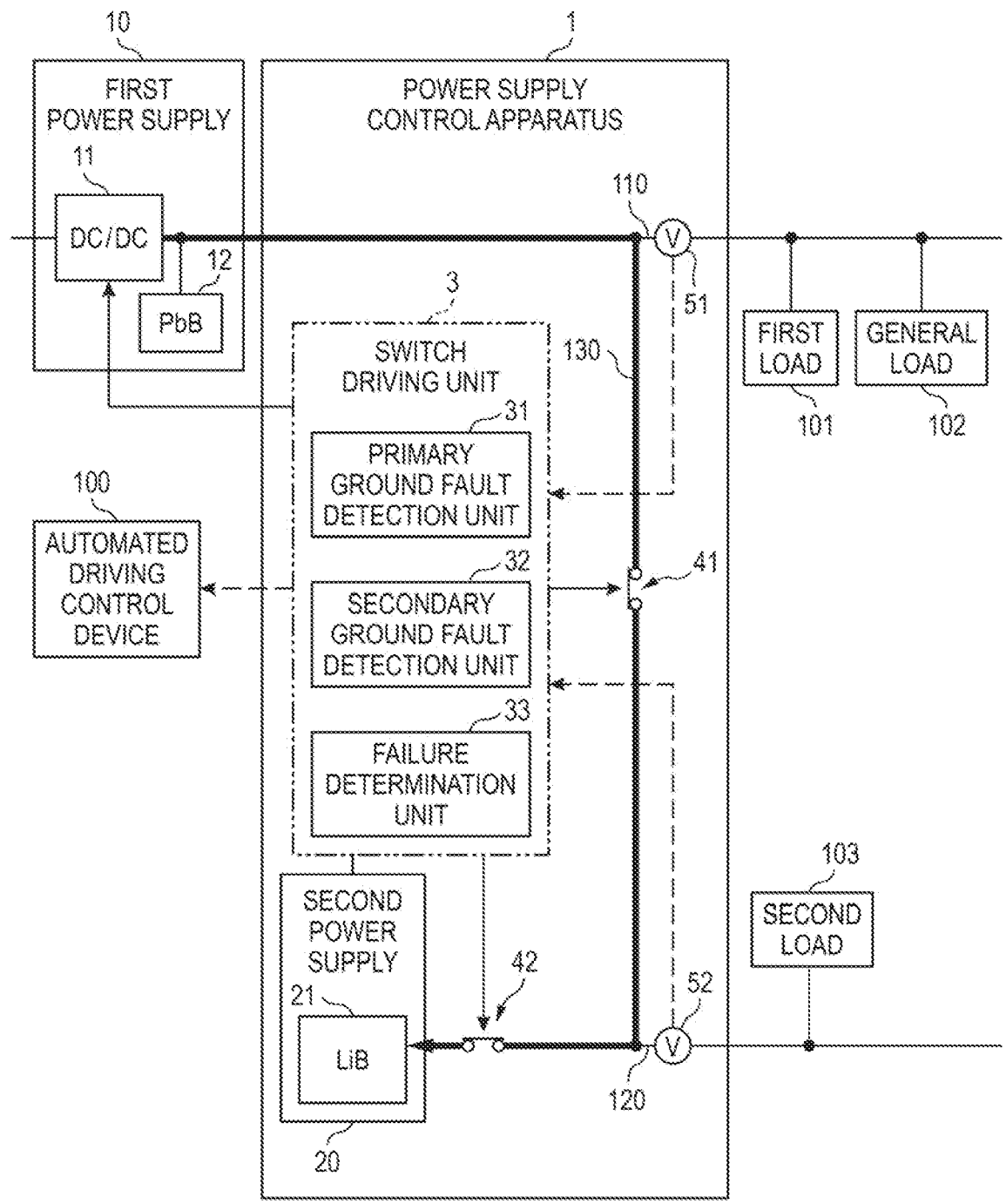
FIG. 6 is an illustrative diagram illustrating an operation example of the power supply control apparatus according to the embodiment.

The switch driving unit 3 is connected to the second power supply 20 and monitors a voltage of the second power supply 20 (state of charge (SOC) of the LiB 21). When the voltage of the second power supply 20 decreases to a predetermined voltage or less, the switch driving unit 3 conducts the inter-system switch 41 and the battery switch 42 to charge the second power supply 20 by the DC/DC 11, as illustrated in FIG. 6.

[4. Problems in Stuck-Opened State of Inter-System Switch]

In the power supply control apparatus 1, when the first load 101 or the general load 102 temporarily becomes an overload state instead of the ground fault 200 or 201, the voltage detected by the first voltage sensor 51 may temporarily become equal to or less than the ground fault determination threshold. In the power supply control apparatus 1, when the second load 103 temporarily becomes the overload state, the voltage detected by the second voltage sensor 52 may temporarily become equal to or less than the ground fault determination threshold.

In this case, in the power supply control apparatus 1, electric power is continuously supplied from the first power supply 10 to the first load 101 and the general load 102, and electric power is supplied from the second power supply 20 to the second load 103. Therefore, after it is temporarily determined that the ground fault 200 or 201 occurs in the first system 110 or the second system 120, if the voltages detected by the first voltage sensor 51 and the second voltage sensor 52 both return to values exceeding the ground fault determination threshold before predetermined time elapses, the switch driving unit 3 determines that there is no abnormality in the power supplies due to a transient voltage drop. Thereafter, in order to return the power supply control apparatus 1 to the normal operation illustrated in FIG. 2, the switch driving unit 3 cuts off the battery switch 42 and connects the inter-system switch 41 again.

Figure 7:
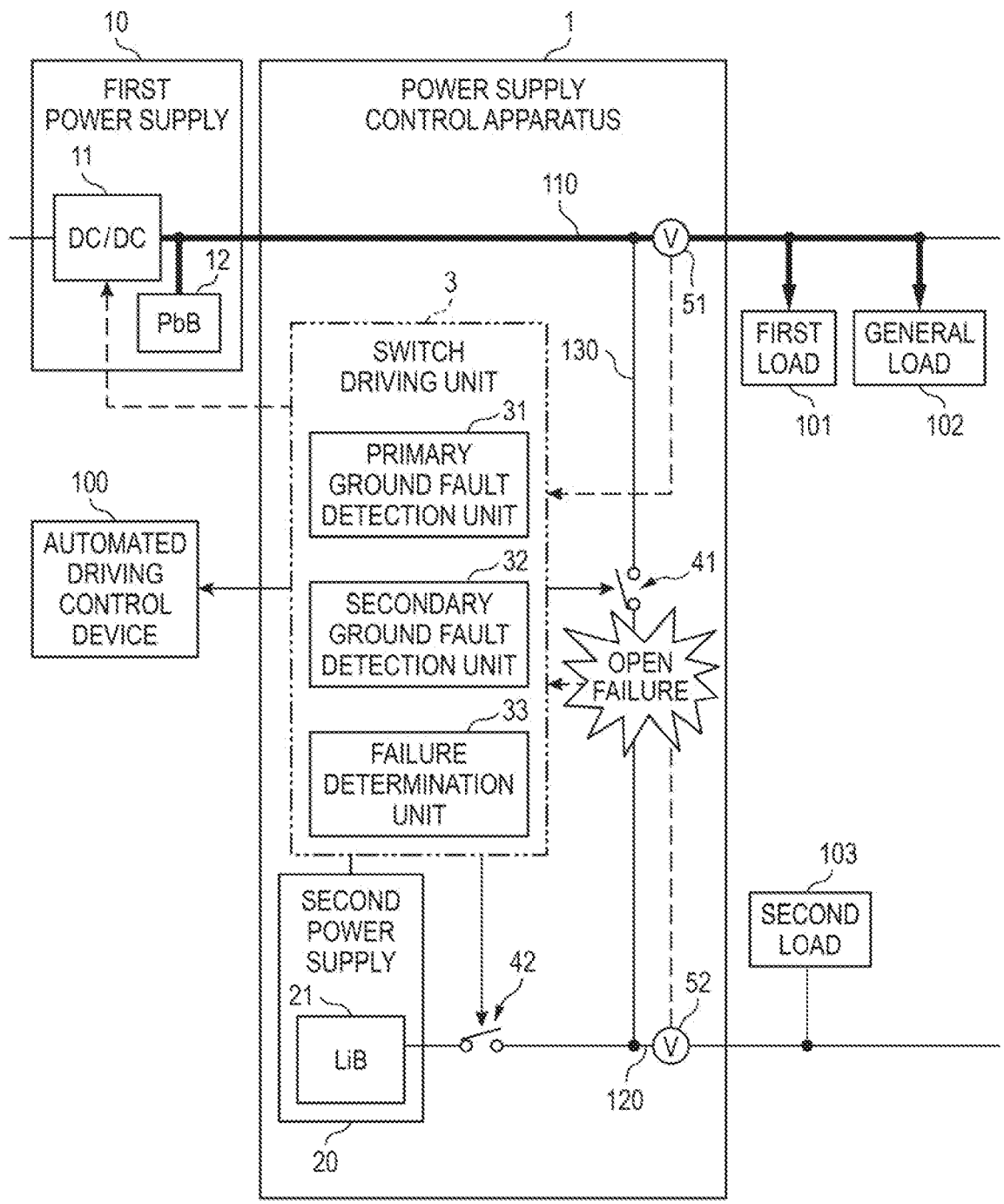
FIG. 7 is an illustrative diagram illustrating an operation example of the power supply control apparatus according to the embodiment.

At this time, as illustrated in FIG. 7, when the inter-system switch 41 is in the stuck-opened state, even if the battery switch 42 is attempted to be cut off and the inter-system switch 41 is attempted to be connected again, the battery switch 42 can be cut off, but the inter-system switch 41 cannot be conducted. Therefore, since power is not supplied from the first power supply 10 to the second system 120, the voltage decreases to the ground fault determination threshold.

Figure 8:
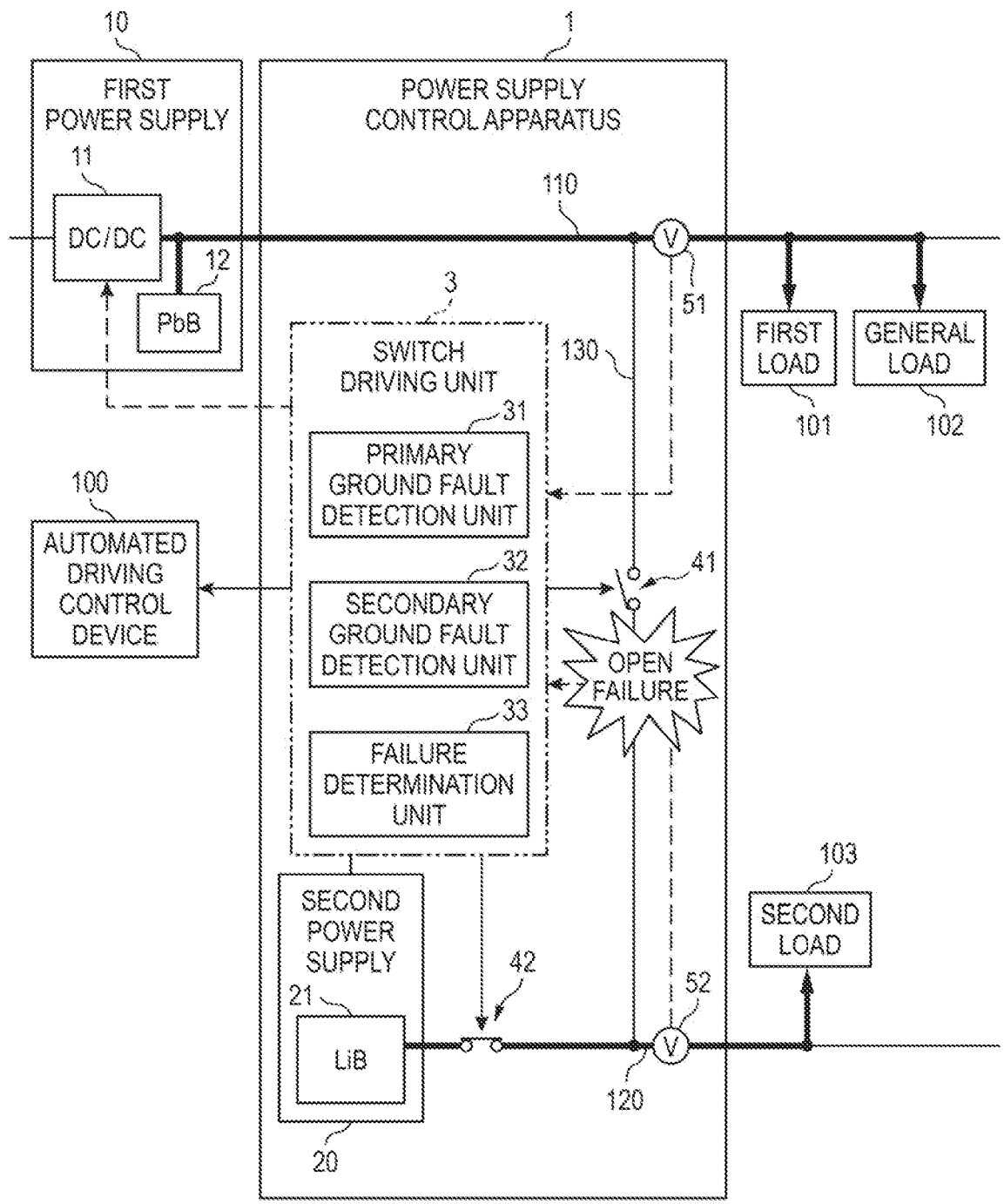
FIG. 8 is an illustrative diagram illustrating an operation example of the power supply control apparatus according to the embodiment.

As a result, the switch driving unit 3 temporarily determines that the ground fault 201 occurs in the second system 120, and as illustrated in FIG. 8, the switch driving unit 3 cuts off the inter-system switch 41 and reconnects the battery switch 42. Accordingly, electric power is supplied from the second power supply 20 to the second system 120, and the voltage of the second system 120 returns to a value exceeding the ground fault determination threshold.

Therefore, the switch driving unit 3 determines that there is no abnormality in the power supply due to the transient voltage drop, and attempts to cut off the battery switch 42 and connect the inter-system switch 41 again in order to return the power supply control apparatus 1 to the normal operation, but the state of the power supply control apparatus 1 returns to a state of FIG. 7. As described above, when the inter-system switch 41 is in the stuck-opened state, the power supply control apparatus 1 alternately repeats the state illustrated in FIG. 7 and a state illustrated in FIG. 8. That is, the power supply control apparatus 1 repeats the cutoff and reconnection of the battery switch 42.

At this time, the power supply control apparatus 1 consumes the electric power of the second power supply 20 while the battery switch 42 conducts, but since the inter-system switch 41 is in the stuck-opened state, the inter-system switch 41 and the battery switch 42 are conducted and the second power supply 20 cannot be charged. Therefore, the switch driving unit 3 of the power supply control apparatus 1 according to the embodiment includes the failure determination unit 33 that detects the stuck-opened state of the inter-system switch 41.

[5. Configuration Example of Switch Driving Unit According to Embodiment]

Figure 9:
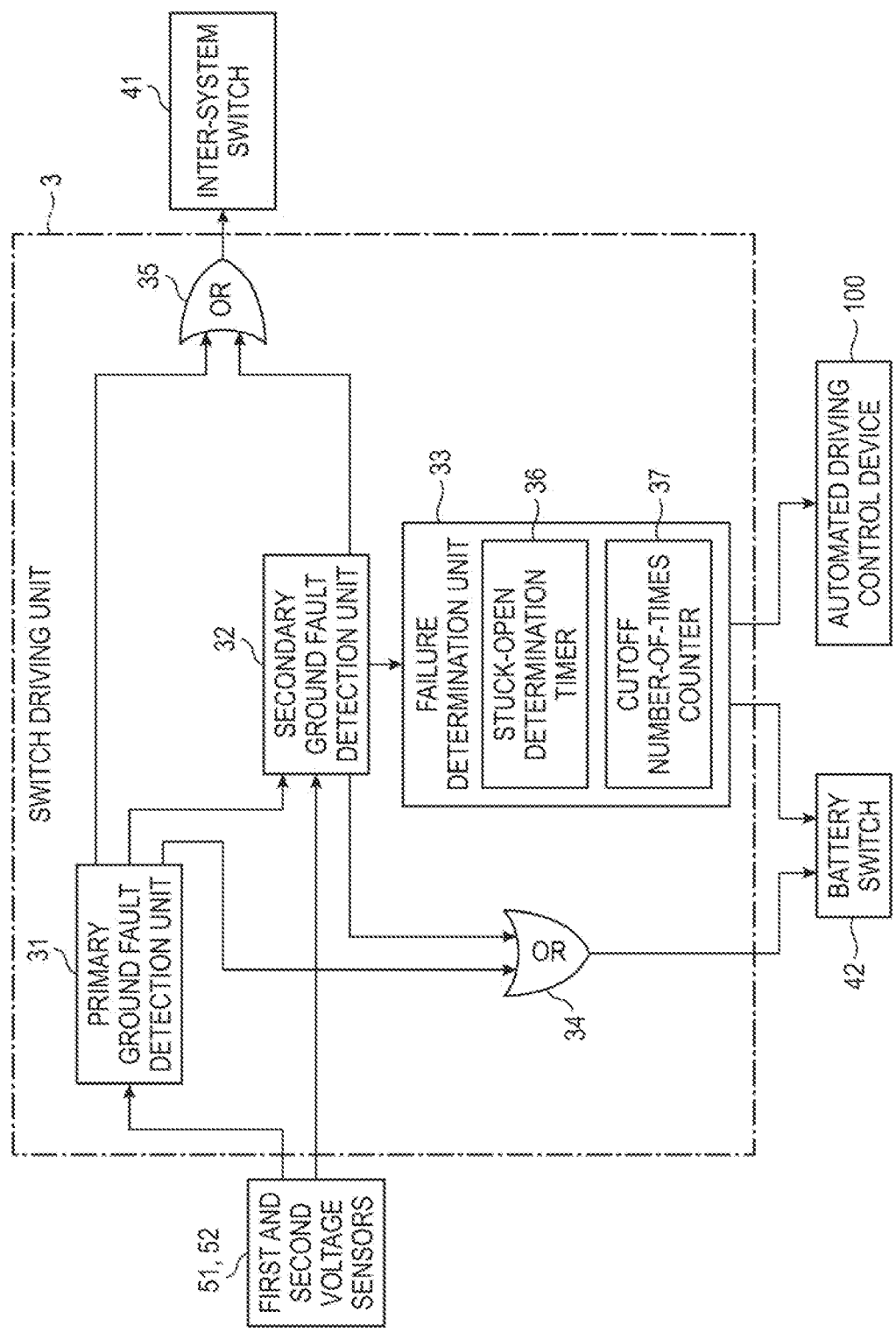
FIG. 9 is an illustrative diagram illustrating a configuration example of a switch driving unit according to the embodiment.

Next, a configuration example of the switch driving unit 3 according to the embodiment will be described with reference to FIG. 9. FIG. 9 is an illustrative diagram illustrating a configuration example of the switch driving unit 3 according to the embodiment.

As illustrated in FIG. 9, the switch driving unit 3 includes the primary ground fault detection unit 31, the secondary ground fault detection unit 32, the failure determination unit 33, an OR logic circuit 34, and an OR logic circuit 35. The detection result of the voltage of the first system 110 is input from the first voltage sensor 51, and the detection result of the voltage of the second system 120 is input from the second voltage sensor 52 to the primary ground fault detection unit 31 and the secondary ground fault detection unit 32.

When the primary ground fault detection unit 31 detects the ground fault of the first system 110 or the second system 120, the primary ground fault detection unit 31 cuts off the inter-system switch 41 and conducts the battery switch 42. Specifically, when the voltage of the first system 110 or the voltage of the second system 120 becomes equal to or less than the ground fault determination threshold, the primary ground fault detection unit 31 outputs a primary ground fault detection signal to the secondary ground fault detection unit 32, the OR logic circuit 34, and the OR logic circuit 35. At this time, the primary ground fault detection unit 31 outputs, for example, a primary ground fault detection signal of a one-shot pulse of 50 ms. When the primary ground fault detection signal is input from the primary ground fault detection unit 31, the secondary ground fault detection unit 32 outputs a secondary ground fault detection signal to the OR logic circuit 34, the OR logic circuit 35, and the failure determination unit 33.

When the primary ground fault detection signal or the secondary ground fault detection signal is input from the primary ground fault detection unit 3, the OR logic circuit 35 outputs a cutoff signal to the inter-system switch 41 to cut off the inter-system switch 41. When the primary ground fault detection signal is input from the primary ground fault detection unit 31 or the secondary ground fault detection signal is input from the secondary ground fault detection unit 32, the OR logic circuit 34 outputs a control signal to the battery switch 42 to conduct the battery switch 42.

That is, since the detection speed of the primary ground fault detection unit 31 is higher than that of the secondary ground fault detection unit 32, when the voltage of the first system 110 or the second system 120 decreases, the inter-system switch 41 is immediately cut off and the battery switch 42 is conducted by the primary ground fault detection signal from the primary ground fault detection unit 31. Thereafter, the secondary ground fault detection signal from the secondary ground fault detection unit 32 causes the inter-system switch 41 to be OFF and the battery switch 42 to be conducted continuously.

When the ground fault is detected by the primary ground fault detection unit 31, the secondary ground fault detection unit 32 specifies whether the system in which the ground fault is detected is the first system 110 or the second system 120, and when the ground fault is eliminated, the secondary ground fault detection unit performs return control of reconnecting the inter-system switch 41 and cutting off the battery switch 42.

Specifically, when the ground fault is detected by the primary ground fault detection unit 31, the secondary ground fault detection unit 32 samples the voltages of the first system 110 and the second system 120 at a predetermined cycle for a predetermined period. Then, the secondary ground fault detection unit 32 specifies, as a system in which the ground fault is detected, a system in which the voltage equal to or less than the ground fault determination threshold is sampled continuously for a predetermined time (for example, 100 ms) or more.

Further, when the secondary ground fault detection unit 32 samples the voltage exceeding the ground fault determination threshold continuously for a predetermined time (for example, 40 ms) or more, the secondary ground fault detection unit 32 determines that the ground fault is not continued and stops the output of the secondary ground fault detection signal to the OR logic circuit 35. That is, a connection signal is output. When the connection signal is input from the secondary ground fault detection unit 32, the OR logic circuit 35 outputs the connection signal to the inter-system switch 41 to reconnect the inter-system switch 41. At this time, the secondary ground fault detection unit 32 outputs the control signal to the battery switch 42 via the OR logic circuit 34 to cut off the battery switch 42.

The failure determination unit 33 determines that the inter-system switch 41 is in the stuck-opened state when frequency at which the return control and the ground fault detection by the primary ground fault detection unit 31 are repeated after the ground fault is detected by the primary ground fault detection unit 31 is equal to or higher than a predetermined frequency.

Specifically, the failure determination unit 33 includes a stuck-open determination timer 36 and a cutoff number-of-times counter 37. The stuck-open determination timer 36 resets a measurement time every time a predetermined time elapses. For example, the stuck-open determination timer 36 resets the measurement time every 5 seconds.

Each time a signal indicating that the occurrence of the ground fault in the first system 110 or the second system 120 is detected is input from the primary ground fault detection unit 31 via the secondary ground fault detection unit 32, the cutoff number-of-times counter 37 adds 1 to a count value indicating the number of times of cutoff of the inter-system switch 41. The cutoff number-of-times counter 37 resets the count value every time the measurement time of the stuck-open determination timer 36 becomes equal to or longer than the predetermined time.

When the count value of the cutoff number-of-times counter 37 reaches a predetermined number of times (for example, three times) or more before the measurement time of the stuck-open determination timer 36 reaches the predetermined time, the failure determination unit 33 determines that the state illustrated in FIG. 7 and the state illustrated in FIG. 8 are repeated at predetermined frequency or more, and determines that the inter-system switch 41 is in the stuck-opened state. As described above, according to the power supply control apparatus 1, the failure determination unit 33 can determine whether the inter-system switch 41 is in the stuck-opened state.

When the failure determination unit 33 determines that the inter-system switch 41 is in the stuck-opened state, the failure determination unit 33 outputs the automated driving prohibition signal to the automated driving control device 100 to prohibit automated driving. Accordingly, in the power supply control apparatus 1, the inter-system switch 41 is in the stuck-opened state, and it is possible to prevent a transition to automated driving in a dangerous state where the second power supply 20 cannot back up the first power supply 10.

After it is determined that the inter-system switch 41 is in the stuck-opened state, the failure determination unit 33 prohibits conduction of the battery switch 42 by the primary ground fault detection unit 31 even when a ground fault is detected by the primary ground fault detection unit 31.

Specifically, when the signal indicating that the occurrence of the ground fault in the first system 110 or the second system 120 is detected is input from the primary ground fault detection unit 31 via the secondary ground fault detection unit 32 after it is determined that the inter-system switch 41 is in the stuck-opened state, the failure determination unit 33 outputs a control signal for prohibiting subsequent conduction of the battery switch 42 to the battery switch 42.

Accordingly, the power supply control apparatus 1 can suppress deterioration of the LiB 21 due to repeated discharge by preventing the second power supply 20 from being unnecessarily discharged after the intersystem switch 41 is in the stuck-opened state.

[6. Processing Executed by Switch Driving Unit]

Figure 10:
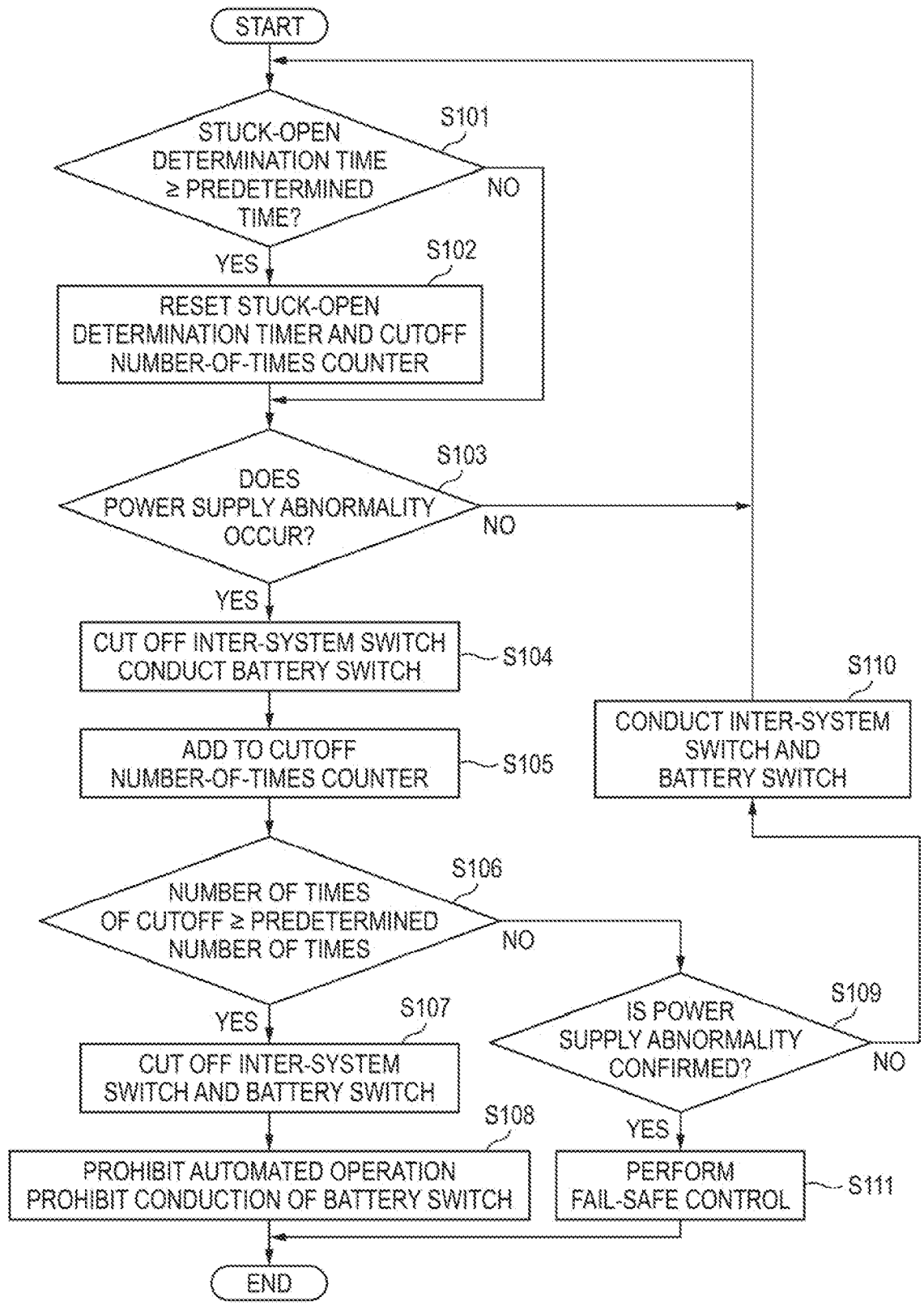
FIG. 10 is a flowchart illustrating an example of processing executed by the switch driving unit according to the embodiment.

Next, processing executed by the switch driving unit 3 of the power supply control apparatus 1 will be described with reference to FIG. 10. FIG. 10 is a flowchart illustrating an example of the processing executed by the switch driving unit 3 of the power supply control apparatus 1 according to the embodiment. The switch driving unit 3 repeatedly executes the processing illustrated in FIG. 10 during the normal operation.

Specifically, as illustrated in FIG. 10, the switch driving unit 3 first determines whether a stuck-open determination time of the inter-system switch 41 is equal to or longer than a predetermined time (step S101). When it is determined that the stuck-open determination time is not equal to or longer than the predetermined time (step S101: No), the switch driving unit 3 moves the processing to step S103.

When it is determined that the stuck-open determination time is equal to or longer than the predetermined time (step S101: Yes), the switch driving unit 3 resets the stuck-open determination timer 36 and the cutoff number-of-times counter 37 (step S102), and determines whether a power supply abnormality occurs (step S103). When the switch driving unit 3 determines that the power supply abnormality does not occur (step S103: No), the processing proceeds to step S101.

When it is determined that the power supply abnormality occurs (step S103: Yes), the switch driving unit 3 cuts off the inter-system switch 41 and conducts the battery switch 42 (step S104). Subsequently, the switch driving unit 3 adds 1 to the count value of the cutoff number-of-times counter 37 (step S105).

Then, the switch driving unit 3 determines whether the number of times of cutoff of the inter-system switch 41 is equal to or greater than the predetermined number of times (step S106). When it is determined that the number of times of cutoff is equal to or greater than the predetermined number of times (step S106: Yes), the switch driving unit 3 cuts off the inter-system switch 41 and the battery switch 42 (step S107), prohibits the automated operation, prohibits the conduction of the battery switch 42 (step S108), and ends the processing.

When it is determined that the number of times of cutoff is not equal to or greater than the predetermined number of times (step S106: No), the switch driving unit 3 determines whether the power supply abnormality is confirmed (step S109). When it is determined that the power supply abnormality is not confirmed (step S109: No), the switch driving unit 3 conducts the inter-system switch 41 and the battery switch 42 (step S110), and the processing proceeds to step S101. When it is determined that the power supply abnormality is confirmed (step S109: Yes), the switch driving unit 3 performs fail-safe control (step S111) and ends the processing.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCES SIGNS LIST 1 power supply control apparatus
10 first power supply
11 DC/DC
12 PbB
20 second power supply
21 LiB
3 switch driving unit
31 primary ground fault detection unit
32 secondary ground fault detection unit
33 failure determination unit
34 OR logic circuit
35 OR logic circuit
36 stuck-open determination timer
37 cutoff number-of-times counter
41 inter-system switch
42 battery switch
51 first voltage sensor
52 second voltage sensor
100 automated driving control device
101 first load
102 general load
103 second load
110 first system
120 second system

What is claimed is:

1. A power supply control apparatus comprising:
a first system configured to supply electric power of a first power supply to a first load;
a second system configured to supply electric power of a second power supply to a second load;
an inter-system switch capable of connecting the first system to the second system and disconnecting the first system from the second system;
a battery switch capable of connecting the second power supply to the second system and disconnecting the second power supply from the second system;
a primary ground fault detection hardware circuit configured to cut off the inter-system switch and conduct the battery switch when a ground fault of the first system or the second system is detected by the primary ground fault detection hardware circuit; and
at least one processor configured to implement:
in a case where the ground fault is detected by the primary ground fault detection hardware circuit, specifying whether a system in which the ground fault is detected is the first system or the second system, and performing return control of reconnecting the inter-system switch and cutting off the battery switch when the ground fault is eliminated; and
determining that the inter-system switch is in a stuck-opened state when frequency at which the return control and the detecting of the ground fault by the primary ground fault detection hardware circuit are repeated after the ground fault is detected by the primary ground fault detection hardware circuit is equal to or higher than a predetermined frequency.

2. The power supply control apparatus according to claim 1,
wherein the at least one processor is configured to prohibit automated driving by an automated driving control device when the at least one processor determines that the inter-system switch is in the stuck-opened state.

3. The power supply control apparatus according to claim 2,
wherein the at least one processor is configured to, after the at least one processor determines that the inter-system switch is in the stuck-opened state, prohibit conduction of the battery switch by the primary ground fault detection hardware circuit even when the ground fault is detected by the primary ground fault detection hardware circuit.

4. The power supply control apparatus according to claim 1,
wherein the at least one processor is configured to, after the at least one processor determines that the inter-system switch is in the stuck-opened state, prohibit conduction of the battery switch by the primary ground fault detection hardware circuit even when the ground fault is detected by the primary ground fault detection hardware circuit.

5. A power supply control apparatus comprising:
a first system configured to supply electric power of a first power supply to a first load;
a second system configured to supply electric power of a second power supply to a second load;
an inter-system switch capable of connecting the first system to the second system and disconnecting the first system from the second system;
a battery switch capable of connecting the second power supply to the second system and disconnecting the second power supply from the second system; and
at least one processor configured to implement:
cutting off the inter-system switch and conducting the battery switch when the ground fault of the first system or the second system is detected by the at least one processor;
in a case where the ground fault is detected by the at least one processor, specifying whether a system in which the ground fault is detected is the first system or the second system, and performing return control of reconnecting the inter-system switch and cutting off the battery switch when the ground fault is eliminated; and
determining that the inter-system switch is in a stuck-opened state when frequency at which the return control and the detecting of the ground fault by the at least one processor are repeated after the ground fault is detected by the at least one processor is equal to or higher than a predetermined frequency.

6. The power supply control apparatus according to claim 5,
wherein the at least one processor is configured to prohibit automated driving by an automated driving control device when the at least one processor determines that the inter-system switch is in the stuck-opened state.

7. The power supply control apparatus according to claim 6,
wherein the at least one processor is configured to, after the at least one processor determines that the inter-system switch is in the stuck-opened state, prohibit conduction of the battery switch by the at least one processor even when the ground fault is detected by the at least one processor.

8. The power supply control apparatus according to claim 5,
wherein the at least one processor is configured to, after the at least one processor determines that the inter-system switch is in the stuck-opened state, prohibit conduction of the battery switch by the at least one processor even when the ground fault is detected by the at least one processor.

9. A power supply control method comprising:
a primary ground fault detection step, by a primary ground fault detection unit of a power supply control apparatus that includes a first system configured to supply electric power of a first power supply to a first load, a second system configured to supply electric power of a second power supply to a second load, an inter-system switch capable of connecting the first system to the second system and disconnecting the first system from the second system, and a battery switch capable of connecting the second power supply to the second system and disconnecting the second power supply from the second system, of cutting off the inter-system switch and conducting the battery switch when a ground fault of the first system or the second system is detected by the primary ground fault detection unit;

a secondary ground fault detection step, by a secondary ground fault detection unit of the power supply control apparatus, in a case where the ground fault is detected by the primary ground fault detection unit, of specifying whether a system in which the ground fault is detected is the first system or the second system, and performing return control of reconnecting the inter-system switch and cutting off the battery switch when the ground fault is eliminated; and a failure determination step, by a failure determination unit of the power supply control apparatus, of determining that the inter-system switch is in a stuck-opened state when frequency at which the return control and the detecting of the ground fault by the primary ground fault detection unit are repeated after the ground fault is detected by the primary ground fault detection unit is equal to or higher than a predetermined frequency.

* * * * *